June 20, 1933.  N. P. LARSEN  1,915,133
REEL
Filed March 2, 1931   2 Sheets-Sheet 1

Inventor;
Neil P. Larsen
Kwis Hudson & Kent
attys.

Patented June 20, 1933

1,915,133

UNITED STATES PATENT OFFICE

NEIL P. LARSEN, OF CLEVELAND, OHIO, ASSIGNOR TO THE AMERICAN COACH AND BODY COMPANY, OF CLEVELAND, OHIO, A CORPORATION OF OHIO

REEL

Application filed March 2, 1931. Serial No. 519,331.

This invention relates to collapsible power reels and more particularly to reels of this type which can be utilized for both reeling and unreeling operations.

The principal object of the invention resides in the provision of a simple and efficient collapsible reel which is readily adaptable to a plurality of uses and which can be used for both winding and unwinding operations.

A more particular object of the invention is to provide adjustable braking or tension means in conjunction with the reel when it is used for unwinding coiled material.

Another object of the invention is the provision of improved means for quickly and positively changing the reel from reeling to unreeling operation or position.

It is also an object of the invention to improve on heretofore known types of reel collapsing mechanism.

The foregoing and other objects of the invention, which will become apparent as the description proceeds, are achieved by the apparatus described below and illustrated in the accompanying drawings. The embodiment of the invention shown and described herein is designed for use on a truck or the like. However, it will be understood that the invention is broadly applicable to reels of all types.

In the drawings:

Fig. 3 is a partial sectional view similar to Fig. 2 and showing the means for locking the collapsible reel supporting sleeve to the hollow driven spindle. This is shown in the unlocked position, and Fig. 4 is a sectional view taken on the line 4—4 of Fig. 3.

Figure 1:
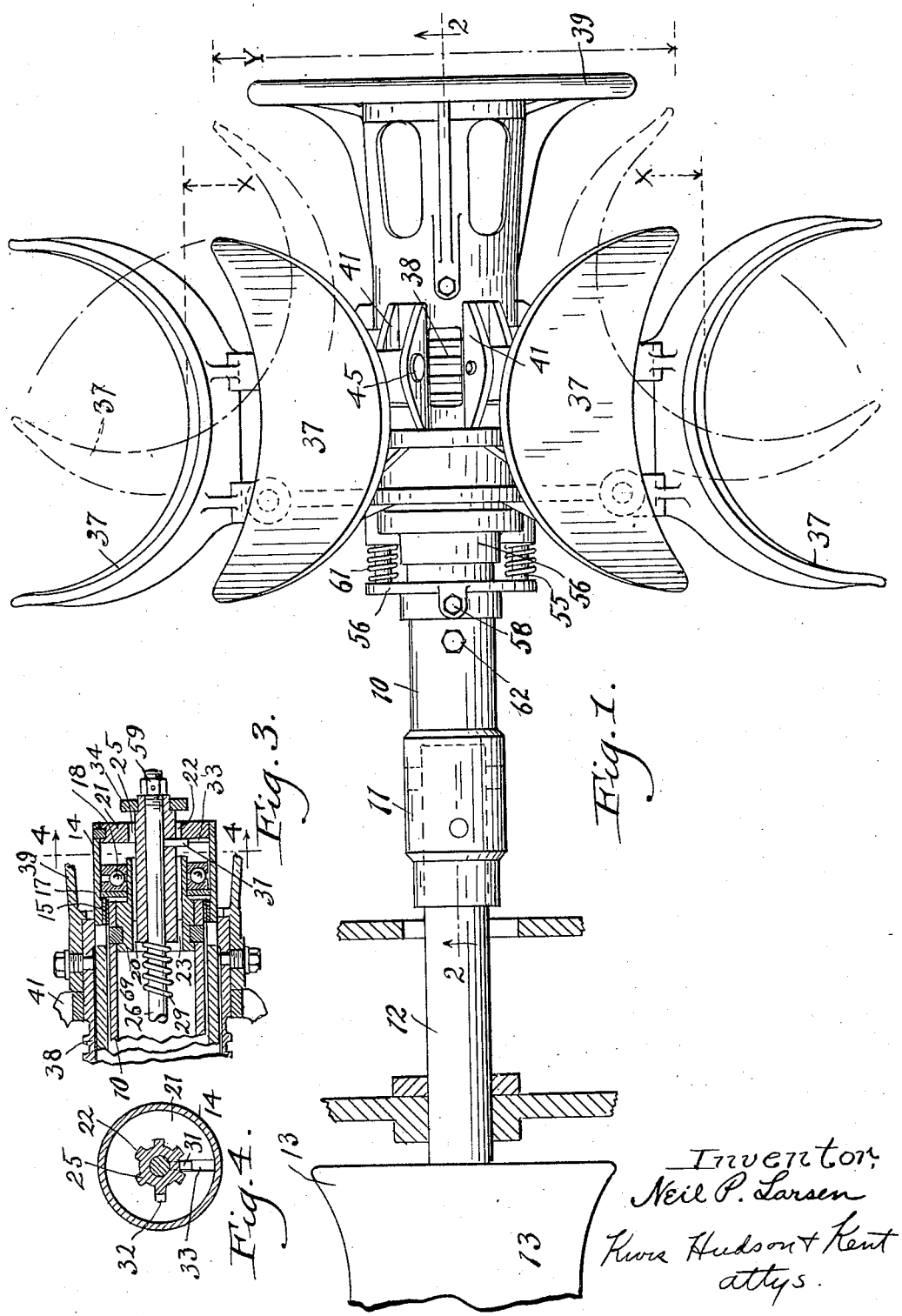
Figure 1 is an elevation of the reel embodying the invention.

Referring to the drawings, the numeral 10 indicates a hollow spindle which is formed with a socket 11 by which it may be secured to any suitable driven shaft 12 which is operated by means indicated diagrammatically at 13. A sleeve 14 is journaled on the spindle 10 through the agency of bushings 15. The position of the sleeve 14 on the spindle 10 is controlled axially by a collar 16 and a washer 17. The washer 17 engages with a thrust bearing 18 which is carried on a tube 19 secured inside the end of the spindle 10.

In order to releasably lock the sleeve 14 and spindle 10 together, suitable means are provided which may include a disc 21 fixed in the end of the sleeve 14. The disc 21 is provided with interal spline teeth 22 and the tube 19 is also provided with similar internal spline teeth 23. A connector member 24 is provided to lock the disc 21 and the tube 19 together, and for this purpose is formed with two annular rows of spline teeth 20 and 25 which are adapted to simultaneously engage with the internal spline teeth 22 and 23 on the disc 21 and tube 19, respectively. The connector 24 is slidably journaled on a rod 26 carried at the axis of the spindle 10.

The rod 26 is threaded as at 27 at its inner end and carries thereon a nut 28. Carried between the nut 28 and connector 24 is a spring 29 which yieldably urges the connector 24 out to the position indicated in Fig. 2 which is the position in which the sleeve 14 and spindle 10 are locked together. The connector 24 is provided with a radial pin 31 and the disc 21 is formed with a slot 32 and a radial half-round groove 33. By this construction it is possible to move the connector 24 inwardly of the hollow spindle, the pin 31 passing through the slot 32 in the disc 21 and the connector being rotated to bring the pin 31 into engagement with the groove 33. With the parts in this position, which is indicated in Fig. 3, the spline teeth 20 and 25 will be out of register with the internal spline teeth 22 and 23 on the disc 21 and tube 19, respectively, so that the sleeve 14 and spindle 10 are free to rotate relative to each other. A hand-wheel 34 is secured to an outer end of the connector 24 so that the locking and unlocking operation can be readily performed.

Secured to the sleeve 14 is a spider member 35 which pivotally supports, as at 36, a plurality of reel forming arms or brackets 37.

The other side of the reel forming arms 37 are supported by collapsing mechanism which includes a hollow screw 38 which is journaled on the sleeve 14 and to which is secured an operating hand-wheel 39. Journaled on the screw is a spider hub 41 which is axially positioned thereon by a collar 42 and by the end of the hand-wheel 39. A lever 43 pivotally connects, as at 44 and 45, each arm 37 to the spider hub 41. Each lever 43 is formed with an arcuate gear segment 44 which cooperates or engages with the screw 38.

Figure 2:
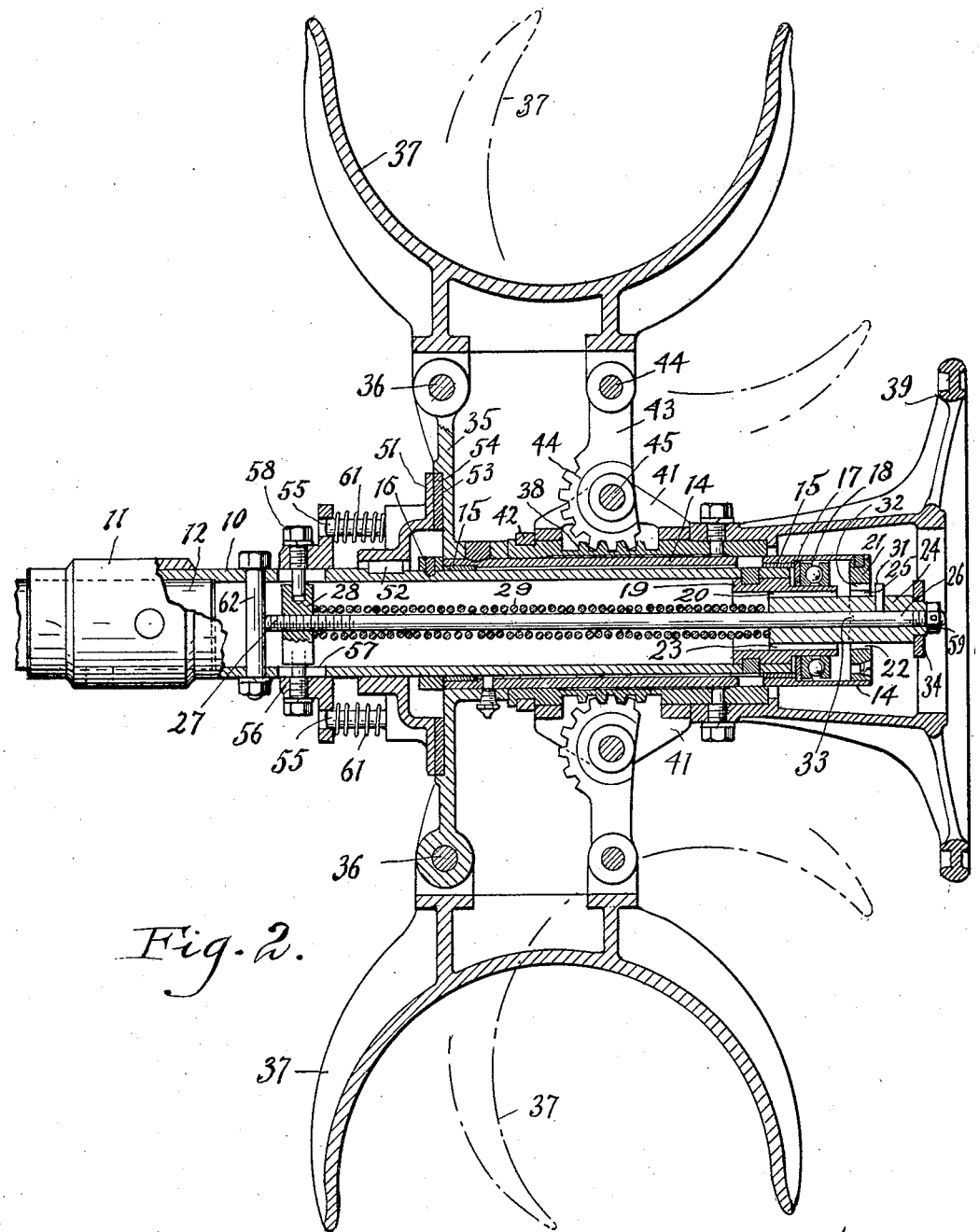
Fig. 2 is a sectional view taken on the line 2—2 of Fig. 1.

In this manner when the hand-wheel 39 is turned to rotate the screw 38 relative to the sleeve 14 the levers 43 will be tipped to collapse the reel arms 37 into the dotted positions indicated in Figs. 1 and 2. It will be seen that in this operation the screw 38 must not only rotate relative to the sleeve 14, but have some axial movement outwardly with respect thereto as well.

Referring to Fig. 1 it will be evident that the diameter of the reel when in the expanded or operating position, which distance is indicated as X in the drawings is greater than the distance Y which is the diameter between the ends of the reel arms when they are in the collapsed position. The difference between X and Y is the clearance between any reeled material and the reel when in the collapsed position, which from the drawings, will be seen to be sufficient so that no difficulty will be experienced in removing the reeled material from the collapsed reel.

The reel is provided with braking means which are used in unwinding operations. In the form of the invention illustrated, these means include a brake flange 51 which is splined as at 52 to the spindle 10. The spider member 35 is machined with a suitable annular surface 53, and a ring of braking material 54 is provided between the flange 51 and the surface 53. The braking flange 51 is provided with a plurality of posts 55 which are received in suitable holes in a flange 56 which is splined to the spindle 10 by providing suitable slots 57 therein and securing the flange by pin bolts 58 which extend therethrough. The pin bolts 58 extend into the nut 28 so that by turning the rod 26 the position of the flange 56 on the spindle 10 can be axially controlled. The rod 26 is provided at its outer end with a nut 59 by which the rod may be turned. Springs 61 are provided on the posts 55 so that the force or tension of the brake, as influenced by the axial position of the flange 56, is applied through the springs 61. A pin or bolt 62 is fixed in the spindle 10 and serves to control the axial movement of the rod 26.

The operation of the reel is believed to be apparent from the foregoing description. However, a brief résumé thereof follows: With the reel in the expanded or operating position, shown in Fig. 2, the reel may be used to coil any reelable material thereon, and is generally used in this connection for pulling down old electric wires, or for coiling wire which has been pulled down and prepared for coiling. After the material has been reeled by driving the shaft 12, the same is stopped and the reel is collapsed by rotating the hand-wheel 39 which will tip the levers 43 and move the reel arms into the dotted positions indicated in the drawings. At this time the reeled material may be readily removed.

If it is desired to reel more wire the reel is again expanded by turning the hand-wheel 39 in the reverse direction. If, however, it is desired to use the reel for unreeling purposes the material to be unreeled is slipped on the reel when it is in the collapsed position and the hand-wheel is then turned to expand the reel arms so that the material will be held on the reel. The hand-wheel 34 is now gripped and pushed inwardly to move the pin 31 through the slot 32 in the disc 21 and the hand-wheel 34 is then rotated to bring the pin 31 into engagement with the groove 33. This operation will, of course, move the spline teeth 20 and 25 on the connector out of engagement with the internal disc 21 and tube 19 so that the sleeve 14 which carries the reel will be free to rotate on the spindle 10.

The tension on the braking means is now adjusted by turning the nut 59 so that the reel will not overrun in the unreeling operation. To again bring the parts to the reeling position the operation is of course reversed.

It will be understood that the shaft 12 is connected to any suitable source of power which may be either machine or manually operated means.

It will also be seen that when the reel is in the expanded position the levers 43 are radial or perpendicular of the spindle 10. By this provision the reel is substantially locked in the expanded position and any radially inward thrust on the reel arms 37 will have no tendency to cause the screw 38 to move outwardly on the sleeve 14. In addition, the gear connection between the screw and the lever 43 serves to lock the reel in the expanded or working position.

In accordance with the patent statutes one specific embodiment of the invention has been particularly described and illustrated. However, it will be understood that this is illustrative only and in no sense limiting and that the scope of the invention is defined by the appended claims.

Having thus described my invention, I claim:

1. A reel comprising a driven spindle, collapsible reel forming means journalled thereon, means for releasably locking said spindle and reel forming means together, means for collapsing said reel forming means, and adjustable braking means splined to said spindle and engaging with said reel forming means.

2. A reel comprising a driven spindle, collapsible reel forming means journaled thereon, means for releasably locking said spindle and reel forming means together, means for collapsing said reel forming means, and adjustable braking means engaging with said reel forming means.

3. A reel comprising a driven spindle, reel forming means journaled thereon, means for releasably locking said spindle and reel forming means together, and adjustable braking means splined to said spindle and engaging with said reel forming means.

4. Apparatus of the class described including a spindle, a sleeve journaled on said spindle, a hollow screw journaled on said sleeve, means for releasably locking said spindle and sleeve together, a member fixed to said sleeve, a plurality of reel forming arms pivotally connected to said member, a hub journaled on said hollow screw, a lever pivotally connecting each reel arm with said hub, gear segments on said lever cooperating with said screw, and means for rotating the screw whereby the reel arms are moved radially to collapse or expand the reel.

5. Apparatus of the class described including spindle means, a hollow screw journaled on said spindle means, a member fixed to said spindle means, a plurality of reel forming arms pivotally connected with said member, a hub journaled on said hollow screw, a lever pivotally connecting each reel arm with said hub, gear segments on said levers cooperating with said screw, and means for rotating the screw relative to said spindle means whereby the reel arms are moved radially to collapse and expand the reel.

6. Apparatus of the class described including spindle means, a hollow screw journaled on said spindle means, a member fixed to said spindle means, a plurality of reel forming arms pivotally connected with said member, a hub journaled on said hollow screw, a lever pivotally connecting each reel arm with said hub, gear segments on said levers cooperating with said screw, and means for rotating the screw relative to said spindle means to move the hub away from the member whereby the reel arms are moved radially to collapse and expand the reel.

7. A reel comprising a driven spindle, collapsible reel forming means journaled thereon, means for releasably locking said spindle and reel forming means together, said last named means including aligned gears fixed to said reel forming means and to said spindle, a resiliently positioned gear normally locking said first named gears together and means for moving said last named gear to non-locking position, means for collapsing said reel forming means, and adjustable braking means splined to said spindle and engaging with said reel forming means.

8. In a reel, a driven hollow spindle, a reel carrying member journaled on said spindle, means for releasably locking said reel carrying member on said spindle, a brake flange splined to said spindle and cooperating with the reel carrying member to brake the same, and means extending through the hollow spindle for adjustably controlling the braking tension.

9. In a reel, a driven hollow spindle, a reel carrying member journaled on said spindle, means for releasably locking said reel carrying member on said spindle, a brake mounted on said spindle and cooperating with the reel carrying member to brake the same, and means extending through the hollow spindle for adjustably controlling the braking tension.

10. In a reel, a driven hollow spindle, a reel carrying member on said spindle, a brake flange splined to said spindle and cooperating with the reel carrying member to brake the same, and means extending through the hollow spindle for adjustably controlling the braking tension.

11. A collapsible reel comprising a driven shaft, a sleeve journaled on said shaft, a hollow screw journaled on said sleeve, means for releasably locking said sleeve and shaft together, a spider member fixed to said sleeve, a plurality of reel forming arms pivotally secured to said member, a spider hub journaled on said screw, a plurality of levers pivotally connecting said reel arms with said hub, gear segments formed on said levers cooperating with said screw, hand means for rotating said screw relative to the hub whereby the position of the reel arms is controlled, a brake flange splined on said shaft and adapted to be moved into and out of braking relation with the spider member, and means for adjusting the position of the brake flange.

12. A collapsible reel comprising a driven shaft, a sleeve journaled on said shaft, a hollow screw journaled on said sleeve, means for releasably locking said sleeve and shaft together, a spider member fixed to said sleeve, a plurality of reel forming arms pivotally secured to said member, a spider hub journaled on said screw, a plurality of levers pivotally connecting said reel arms with said hub, gear segments formed on said levers cooperating with said screw, and hand means for rotating said screw relative to the hub whereby the position of the reel arms is controlled.

13. A collapsible reel comprising a driven shaft, a sleeve journaled on said shaft, a hollow screw journaled on said sleeve, means for releasably locking said sleeve and shaft together, a spider member fixed to said sleeve, a plurality of reel forming arms pivotally secured to said member, means operatively connecting said arms with said screw, hand means for rotating said screw relative to the hub whereby the position of the reel arms is controlled, a brake flange splined on said shaft and adapted to be moved into and out of braking relation with the spider member, and means for adjusting the position of the brake flange.

14. A collapsible reel comprising a driven shaft, a sleeve journaled on said shaft, a hollow screw journaled on said sleeve, means for releasably locking said sleeve and shaft together, a spider member fixed to said sleeve, a plurality of reel forming arms pivotally secured to said member, means operatively connecting said arms with said screw, and hand means for rotating said screw relative to the hub whereby the position of the reel arms is controlled.

15. A collapsible power reel comprising a spindle, means for securing and supporting said spindle by one end to a driven shaft, collapsible reel forming means journaled on said spindle, means on the unsupported end of the spindle for controlling the collapsing of the reel forming means, means on the unsupported end of the spindle for releasably locking the reel forming means to the spindle, braking means splined to said spindle and engaging with said reel forming means on the side thereof adjacent the supported end of the spindle, and means on the unsupported end of the spindle for adjusting the tension of said braking means.

16. A collapsible power reel comprising a spindle, means for securing and supporting said spindle by one end to a driven shaft, collapsible reel forming means journaled on said spindle, means on the unsupported end of the spindle for controlling the collapsing of the reel forming means, means on the unsupported end of the spindle for releasably locking the reel forming means to the spindle, braking means engaging with said reel forming means on the side thereof adjacent the supported end of the spindle, and means on the unsupported end of the spindle for adjusting the tension of said braking means.

17. A collapsible power reel comprising a spindle, means for securing and supporting said spindle by one end to a driven shaft, collapsible reel forming means journaled on said spindle, means on the unsupported end of the spindle for controlling the collapsing of the reel forming means, and means on the unsupported end of the spindle for releasably locking the reel forming means to the spindle.

18. A collapsible power reel comprising a spindle, means for securing and supporting said spindle by one end to a driven shaft, collapsible reel forming means journaled on said spindle, means for controlling the collapsing of the reel forming means, means for releasably locking the reel forming means to the spindle, braking means engaging with said reel forming means on the side thereof adjacent the supported end of the spindle, and means for adjusting the tension of said braking means.

19. A collapsible reel including spindle means, a spider member on said spindle means, a plurality of reel forming brackets pivotally secured to said member, a hollow screw journaled on said spindle means, a spider hub journaled on said screw, a lever pivotally connecting each of said brackets with said hub, gear segments formed on said levers cooperating with said screw so that rotation thereof will throw the levers to radially move said brackets, said levers being perpendicular to said spindle means when the reel is in its non-collapsed position.

20. A collapsible reel including spindle means, a spider member on said spindle means, a plurality of reel forming brackets pivotally secured to said member, a hollow screw journaled on said spindle means, a spider hub journaled on said screw, a lever pivotally connecting each of said brackets with said hub, and gear segments formed on said levers cooperating with said screw so that rotation thereof will throw the levers to radially move said brackets.

In testimony whereof, I hereunto affix my signature.

NEIL P. LARSEN.